US006456384B1

United States Patent
Kulawiec et al.

(10) Patent No.: US 6,456,384 B1
(45) Date of Patent: Sep. 24, 2002

(54) MOIRÉ INTERFEROMETER WITH OVERLAPPING ILLUMINATION AND IMAGING SYSTEMS

(75) Inventors: Andrew W. Kulawiec, Fairport; Dag Lindquist; James E. Platten, both of Penfield; Paul G. Dewa, Newark, all of NY (US)

(73) Assignee: Tropel Corporation, Fairport, NY (US)

( * ) Notice: Subject to any disclaimer, the term of this patent is extended or adjusted under 35 U.S.C. 154(b) by 0 days.

(21) Appl. No.: 09/710,660

(22) Filed: Nov. 9, 2000

(51) Int. Cl.[7] .............................................. G01B 11/14
(52) U.S. Cl. ........................................ 356/618; 356/514
(58) Field of Search .............................. 396/609, 618, 396/512, 99

(56) References Cited

U.S. PATENT DOCUMENTS

| 5,085,502 A | | 2/1992 | Womack et al. ............. 356/376 |
| 5,189,493 A | * | 2/1993 | Harding ....................... 356/376 |
| 5,583,632 A | * | 12/1996 | Haga ............................ 356/129 |
| 5,673,144 A | * | 9/1997 | Chastang et al. ............. 359/385 |
| 5,969,819 A | | 10/1999 | Wang ............................ 356/371 |
| 6,133,986 A | * | 10/2000 | Johnson ........................ 355/67 |

OTHER PUBLICATIONS

Computar Telecentric Lenses for Image Processing, Computar 55 Telecentric article, pp. 1–4.
Flatmaster XR, promotional announcement by GCA Tropel with a diagram showing major internal components.
"Optical Shop Testing", edited by Daniel Malacara, copyright 1978 by John Wiley & Sons, Inc, pp. 402–406 and p. 436.

* cited by examiner

Primary Examiner—Samuel A. Turner
Assistant Examiner—Phil Natividad
(74) Attorney, Agent, or Firm—Eugene Stephens & Associates; Thomas B. Ryan

(57) ABSTRACT

A moiré interferometer has an illumination system and an imaging system that share a common focusing optic, which preferably takes the form of a concave mirror. Within the illumination system, the common focusing optic collimates light en route to a test surface. Within the imaging system, the common focusing optic telecentrically images a grating pattern appearing on the test surface onto a fringe pattern detector.

42 Claims, 4 Drawing Sheets

MOIRÉ INTERFEROMETER WITH OVERLAPPING ILLUMINATION AND IMAGING SYSTEMS

TECHNICAL FIELD

Moiré fringes, which can be formed between a grating and its reproduction on a test piece, provide measurements of the test piece's surface topography similar to interference fringes but at larger contour intervals.

BACKGROUND

A grating can be projected or shadow cast onto a test surface and the same or a different grating can be imaged together with the test surface for producing moiré fringes that follow contours of the test surface. The images of two gratings are involved. Ordinarily, one is an actual grating, which has a planar form, and the other is an image of the same or a similar grating, which takes the form of the test surface.

The actual grating contains parallel equally sized and spaced bands (referred to as lines) that alternately block or transmit light. The corresponding lines of the imaged grating depart from such regularity as a function of their relative displacement on the test surface. The difference between the planar form of the grating as a reference surface and the nominally planar form of the test surface appears as fringes formed by a superposition of the two gratings (i.e., simple addition of the overlapping grating lines in a given direction of view).

A full spectrum of visible light can be used for purposes of illumination. Temporal coherency of the light is not required unless a projected grating is itself formed by an interference pattern. Ordinarily, the grating image is formed on the test surface either as a projection of an actual grating or as a shadow pattern of an actual grating that overlies the test surface. The grating projections are preferably made by telecentric illumination systems. The shadow patterns are preferably cast by collimated light. Both approaches minimize perspective distortions and magnification errors associated with imaging the grating on test surfaces that depart from a planer form.

A camera records the grating image on the test surface together with the actual grating or a reference grating. The images of the test surface and the grating variously depart from each other in a direction of the depth of focus of the viewing system. Accordingly, the camera is preferably incorporated within a telecentric viewing system for minimizing viewing angle errors.

The grating lines are generally spaced apart at periods of approximately 50 microns or more to avoid the preponderance of diffractive effects on the light passing through the gratings. Contour intervals between fringes (i.e., the displacement represented by adjacent fringes) are a function of the grating period as well as the angles of illumination and view.

The separate systems for illuminating and viewing the grating and test surface can be costly, especially if telecentric or collimating requirements are imposed upon the systems. For example, the illuminating systems generally require either telecentric optics for projecting accurate grating images or collimating optics for casting accurate shadows from the gratings. The viewing systems also generally require telecentric optics to avoid viewing angle errors between axially displaced areas of the test surfaces.

SUMMARY OF INVENTION

Our invention among its various embodiments simplifies moiré interferometers by using a common focusing optic for both illuminating and viewing a grating pattern on a test surface. For purposes of illumination, the common focusing optic conveys light in a form that accurately reproduces the grating pattern upon the test surface. For purposes of viewing, the common focusing optic contributes to the formation of an accurate image of the grating pattern appearing on the test surface from a different perspective.

Costs normally associated with purchasing and assembling separate focusing optics for accomplishing the illuminating and viewing functions are significantly reduced by utilizing a common focusing optic for both functions. In addition, the common focusing optic renders the interferometer less sensitive to environmental influences that could otherwise affect the two functions more differently.

An exemplary moiré interferometer for measuring flatness of a test surface according to our invention has an illuminating system for illuminating the test surface and an imaging system for imaging the test surface onto a fringe pattern detector. The illuminating system includes a light source and an optical pathway for conveying light embodying a grating pattern to the test surface. The imaging system includes an optical pathway for relaying an image of the grating pattern on the test surface to the fringe pattern detector.

A focusing optic positioned along an intersection of the optical pathways conveys light to and from the test surface. Light conveyed from the light source through the focusing optic casts or projects the grating pattern onto the test surface. Light conveyed from the test surface through the focusing optic images the grating pattern appearing on the test surface onto the detector.

Fringes representative of the test surface's topography are formed by a combination of the grating pattern appearing on the test surface and a reference grating pattern, which can be viewed simultaneously with the grating pattern on the test surface or simulated by computer processing. The grating pattern appearing on the test surface can be formed in a variety of ways such as from an actual grating, from a combination of actual gratings, or from an interference pattern. Once formed, the grating pattern can be projected or cast onto the test surface. The reference grating pattern can be formed from the same or a similar grating pattern.

According to one version of the invention, the focusing optic both collimates light en route to an overlying grating and test surface and telecentrically images onto the detector a moiré fringe pattern formed by a combination of the grating and its shadow cast upon the test surface. The collimating function provides for casting a high contrast shadow pattern of the grating upon the test surface. The telecentric imaging function increases dimensional accuracy of the imaged fringe pattern by reducing viewing angle and magnification errors associated with variations in the surface in a direction of the depth of focus.

According to another version of the invention, the focusing optic functions both as a telecentric projector and as a telecentric imager. As a telecentric projector, the focusing optic projects an image of the grating pattern onto the test surface at a well defined angle. As a telecentric imager, the focusing optic relays a dimensionally stable image of the grating's appearance on the test surface to the fringe pattern detector. The re-imaged grating pattern taken from the test surface is superimposed on a reference grating pattern to produce the required moiré fringe pattern at the detector. Alternatively, the reference grating pattern could be effectively superimposed during subsequent processing.

The grating pattern cast or projected onto the test surface is preferably formed by an actual grating with equally sized and spaced lines producing a 50 percent duty cycle of transmission and non-transmission (e.g., reflection, absorption, or scattering) laid out on a planar substrate. The illuminating system reproduces the grating line pattern on the nominally planar form of the test surface by shadowing or projection. If reproduced by shadowing, the actual grating overlies the test surface and is imaged as a reference grating together with its shadow cast upon the test surface for producing the required moiré fringe pattern. If reproduced by projection, the actual grating is projected onto the test surface from a more remote location, and the same or a similar grating is superimposed by the imaging system as a reference grating for producing the required moiré fringe pattern.

The grating can also be a virtual grating formed by the mechanism of interference. For example, a beam of coherent light can be divided into two planar wavefronts that are recombined at a controlled angle to produce a pattern of linear fringes. The test surface is located within a region of overlap so that the interference fringes appear on the test surface. Another interference pattern generated by a reference surface or a reference grating can be superimposed on an image of the fringes appearing on the test surface to produce the required moiré fringe pattern. The focusing optic participates in both conveying the underlying light of the planar interfering wavefronts to the test surface and conveying the appearance of the interference pattern on the test surface to the detector.

Although the focusing optic can be arranged to work in either a transmissive mode or a reflective mode, the reflective mode is preferred for illuminating and imaging larger test surfaces. For example, the focusing optic can be formed as a concave spherical mirror having operating dimensions matching those of the test surface.

The optical pathway of the illuminating system intersects the focusing optic at a first angle, and the optical pathway of the imaging system intersects the focusing optic at a second angle. The two angles differ from each other to provide for separately controlling the angle at which the test surface is illuminated from the angle at which the test surface is viewed.

A directional optic located along the optical pathway of the illuminating system provides for controlling an incident angle of the light illuminating the test surface. The primary purpose of the directional optic is to redirect the light from the focusing optic on a path towards the test surface. However, the directional optic can also be arranged as a two-surface reflecting element for forming interference fringes. Another purpose of the directional optic is to provide for phase shifting. The directional optic can be pivoted to vary the incident angle of the light in increments totaling at least one fringe spacing. The detector captures images of the fringe pattern at e of the incremental angles of incidence, and the patterns are evaluated to obtain measures of surface flatness.

DRAWINGS

DETAILED DESCRIPTION

Figure 1:
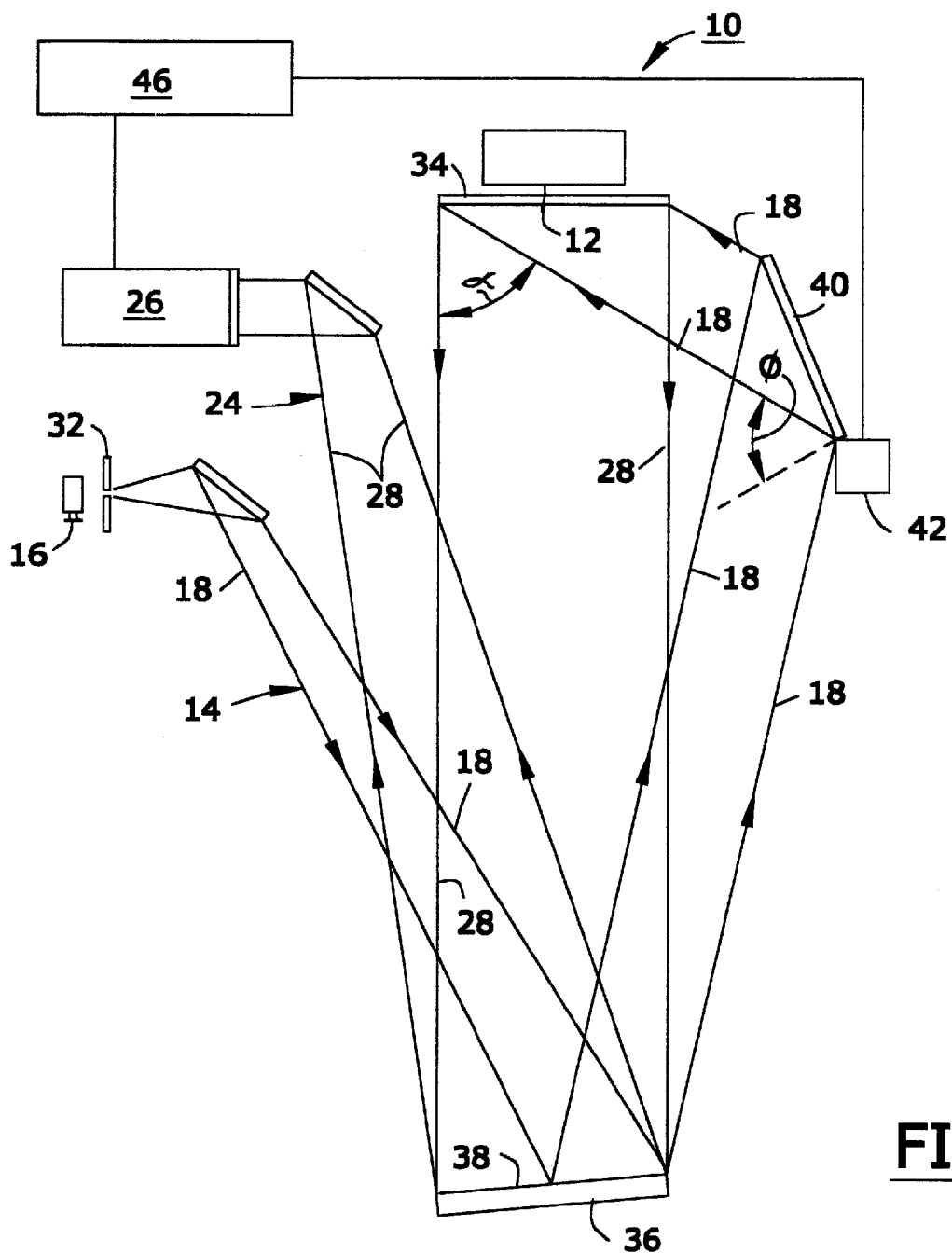
FIG. 1 is a diagram of a new moiré interferometer for measuring surface flatness by casting a grating shadow pattern on a test surface through a common optic with a viewing system that images the shadow pattern on the test surface.

A shadow moiré interferometer 10, as depicted in FIG.1, generates fringe patterns that can be interpreted to assesses the flatness of a test surface 12. An illuminating system 14 of the interferometer includes a light source 16 and an optical pathway 18 for conveying a light beam emitted from the light source 16 to the test surface 12. An imaging system 24 includes a fringe pattern detector 26 and an optical pathway 28 that relays an image of the test surface 12 to the fringe pattern detector 26.

The light source 16 is a conventional white light source such as a halogen lamp (e.g., 500 watt). An aperture stop 32 limits the effective size of the light source 16 for maintaining control over transverse dimensions of the light beam. Other light sources could also be used including one or more superluminous diodes operating in the near infrared spectrum (e.g., around 800 nanometers wavelength). Light emitted from the superluminous diodes diverges within limited cone angles so less light must be discarded to maintain a desired size source. In addition, a more limited range of wavelengths is produced by superluminous diodes, which forms sharper shadows that are less affected by spectral diffractive effects. However, temporal coherency is sufficiently limited to avoid unwanted interference effects.

A grating 34 located just in advance of the test surface 12 is both illuminated by the illuminating system 14 and imaged by the imaging system 24. Preferably, the grating has a planar substrate graduated with equally sized and spaced parallel lines (more precisely bands) having a 50 percent duty cycle of alternately transmitting and not transmitting (e.g., reflection, absorption, or scattering) equal amounts of light. The lines can be formed, for example, by etching and filling with ink or by depositing a material such as chrome in the required line pattern.

The grating frequency or the number of lines per unit length is adjusted to provide a desired amount of sensitivity, i.e., the number of fringes produced over a given range of surface displacement. Wider lines associated with smaller frequencies allow a shadow pattern of the grating 34 to be cast accurately over larger working distances (between the grating 34 and the test surface 12) but sensitivity is reduced.

For one particular application we prefer a grating frequency of around 60 lines per centimeter, but frequencies ranging from 40 to 200 lines per centimeter could also be used for the same application. The grating 34 is sized slightly larger than the area of the test surface 12 intended for study. For example, a 23 centimeter square grating can be used to measure a 20 centimeter square surface.

A focusing optic 36 in the form of a spherical mirror is positioned at an intersection of the optical pathways 18 and 28 of the illuminating system 14 and the imaging system 24. The light beam emitted from the light source 16 diverges to fill a substantial portion of the focusing optic 36. A reflective surface 38 of the focusing optic 36 redirects and collimates the light beam along the optical pathway 18 at a constant diameter large enough to illuminate the area of the test surface 12 intended for study.

Instead of propagating directly to the grating 34 and the test surface 12, the collimated beam is further directed along the optical pathway 18 by a directional optic 40 in the form of a plane mirror. The directional optic 40 is pivoted by an angular drive 42 through discrete increments of angle "φ" to adjust an angle of incidence "α" at which the collimated beam strikes the grating 34 and the test surface 12. The incremental adjustments of angle "φ" are made for purposes of phase shifting. The overall angle of incidence "α" also controls sensitivity, which increases with increasing angles of incidence. Incidence angles "α" of around 60 degrees are preferred for increasing sensitivity while avoiding undue specular reflection from the grating 34 or unwanted shadows from undulations in the test surface 12 or its surrounds.

The collimated beam striking the grating 34 at the incidence angle "α" casts a shadow of the grating line pattern on the test surface 12. Any variation in the surface 12 from the plane form of the grating 34 changes the grating line shadow pattern appearing from a different angular vantage. A moiré fringe pattern can be seen by simultaneously viewing the grating 34 together with its shadow pattern cast upon the test surface 12 from such a vantage. In the instant interferometer 10, the moiré fringe pattern is viewed by the fringe pattern detector 26, which is preferably a charge coupled device (CCD).

The focusing optic 36, which is also located along the optical pathway 28 of the imaging system 24, participates in forming a telecentric image of the moiré fringe pattern at the fringe pattern detector 26. Light from the test surface 12 and the grating 34 is collected by the reflective surface 38 of the focusing optic 36 and directed on a converging path to the fringe pattern detector 26. Additional focusing optics including a zoom lens (not shown) can be used to match the image to the size of the fringe pattern detector 26.

The test surface 12 is mounted on a back surface of the grating 34 opposite to the surface modified to form the grating pattern for conveniently positioning the test surface 12 at a predetermined distance from the grating pattern. The predetermined distance (e.g., 3.3 millimeters) is a compromise between shadow image contrast, which degrades with distance, and ramping errors, which improve with distance. Other mounting arrangements independent of the grating 34 are also possible, such as mounting the test surface 12 on filaments that are substantially invisible in the recorded fringe patterns.

A processor 46 controls the angular orientation of the directional optic 40 and converts the fringe patterns detected by the fringe pattern detector 26 at a number of different angular orientations "φ" into measures of surface displacement. Overall characteristics of the test surface 12 including upper and lower bounds, slope, curvature, and twist, as well as higher order attributes can be determined from the displacement values in accordance with regularly practiced techniques for evaluating comparable interference patterns.

Figure 2:
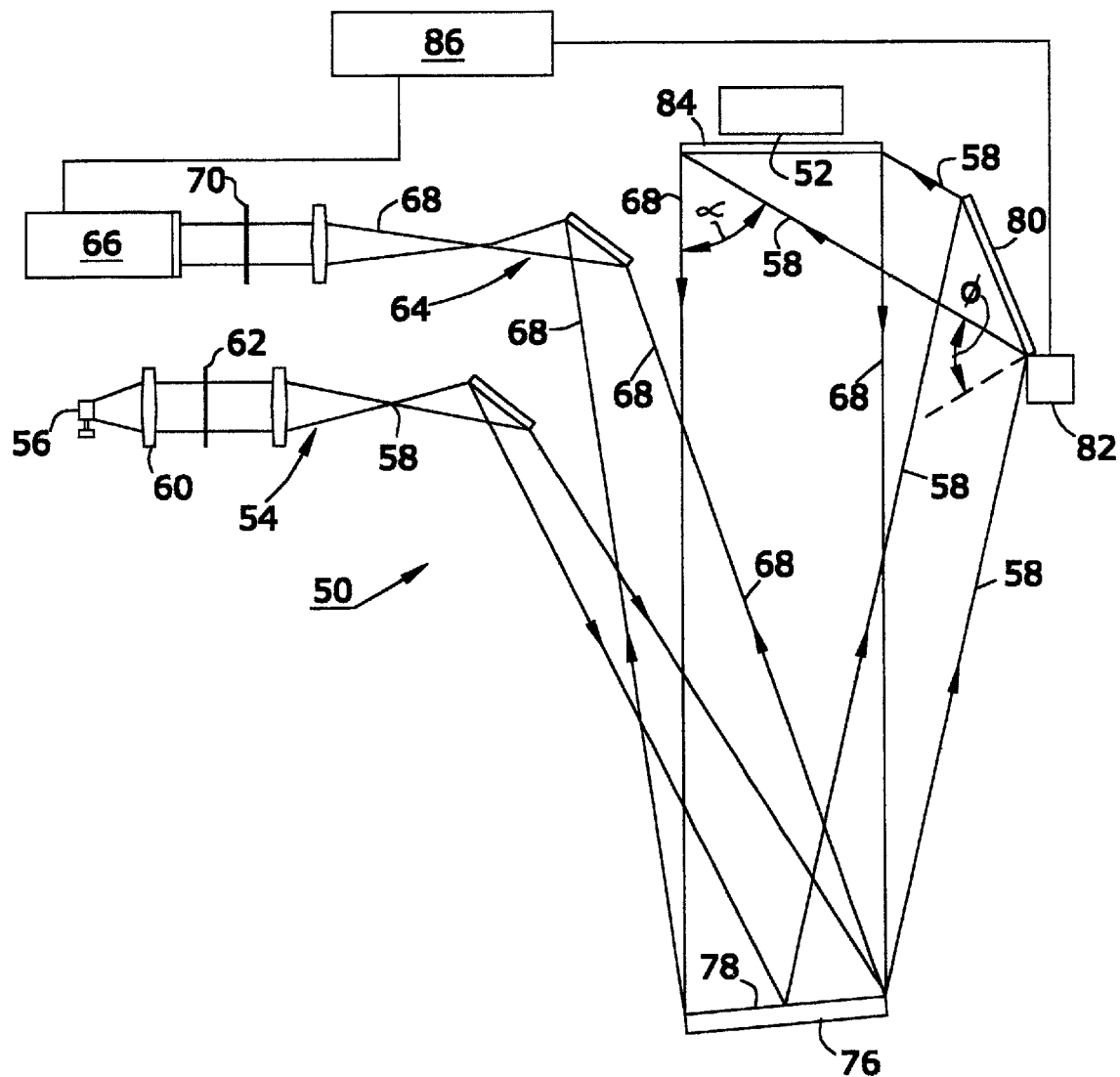
FIG. 2 is a diagram of a new moiré interferometer for measuring surface flatness by projecting a grating pattern onto a test surface through a common optic with a viewing system that images the projected pattern on the test surface.

A projection moiré interferometer 50 laid out schematically in FIG. 2 measures flatness of a test surface 52. An illuminating system 54 includes a light source 56 and an optical pathway 58 similar to the preceding embodiment but also includes projection optics 60 that project an image of a grating 62 along the optical pathway 58 onto the test surface 52. In contrast to the grating 34 of the preceding embodiment, the grating 62 can be sized independently of the test surface 52 by magnifying capabilities of the projection optics 60.

An imaging system 64 is also similar to the preceding embodiment with a fringe pattern detector 66 in the form of a CCD camera for recording an image of the test surface 52 conveyed along an optical pathway 68. A similar reference grating 70 is placed in front of the fringe pattern detector 66 so that the image of the grating 62 appearing on the test surface 52 is viewed by the fringe pattern detector 66 through the reference grating 70 for producing a moiré fringe pattern recording deformations of the test surface 52. However, if resolution of the fringe pattern detector 66 is high enough, the intended contribution of the reference grating 70 can be superimposed at a later processing step.

A common focusing optic 76, which takes the form of a spherical or slightly aspherical mirror, participates in both the illuminating and imaging functions of the projection moiré interferometer 50. As a component of the illuminating system 54, the focusing optic 76 contributes a telecentric projecting capability for projecting the image of the grating 62 at a well-defined incidence angle "α" onto the test surface 52. As a component of the imaging system 64, the focusing optic 76 contributes a telecentric imaging capability for relaying the image of the grating 62 as it appears on the test surface 52 to the fringe pattern detector 66 with reduced viewing angle and magnification errors.

As a part of both the illuminating system 54 and the imaging system 64, the focusing optic 76 is located at an intersection of their respective optical pathways 58 and 68 for illuminating and viewing the test surface 52 from different angular perspectives. For example, although a reflective surface 78 of the focusing optic 76 collects light directly from the test surface 52, the reflective surface 78 projects light indirectly to the test surface 52 through a directional optic 80. An angular servo-drive 82 pivots the directional optic 80 through discrete increments of angle "φ" to adjust an angle of incidence "α" at which the image of grating 62 is projected onto the test surface 52.

A window 84, which takes the form of a plate of glass, supports the test surface 52 in a fixed position for both the illuminating and imaging systems 54 and 64. The test surface 52 can also be supported in other ways, including by being mounted on a fixture located in front of or behind the test surface 52.

A computer processor 86 gathers a succession of phase-shifted fringe patterns from the fringe-pattern detector 66 and calculates displacement values of the test surface 52 as a departure from a planar form. The phase-shifted patterns are distinguished by pivoting the directional optic 80 through discreet angular increments of angle "φ" to adjust an angle of incidence "α" through a range corresponding to at least one fringe spacing.

Software programs, which can direct processor operations for converting light intensity information into angular phase information and for converting angular phase information into displacement information, are all well known in the interferometric measurement art. Further analysis programs for converting displacement information into overall measures of surface characteristics or other mathematical representations of surfaces are also well known. Computer processing can also be used to replace the reference grating 70 with assumptions regarding its expected pattern of transmitting and not transmitting light, particularly it the reference grating 70 can be isolated on a pixel-by-pixel basis within the fringe pattern discriminator 66.

Figure 3:
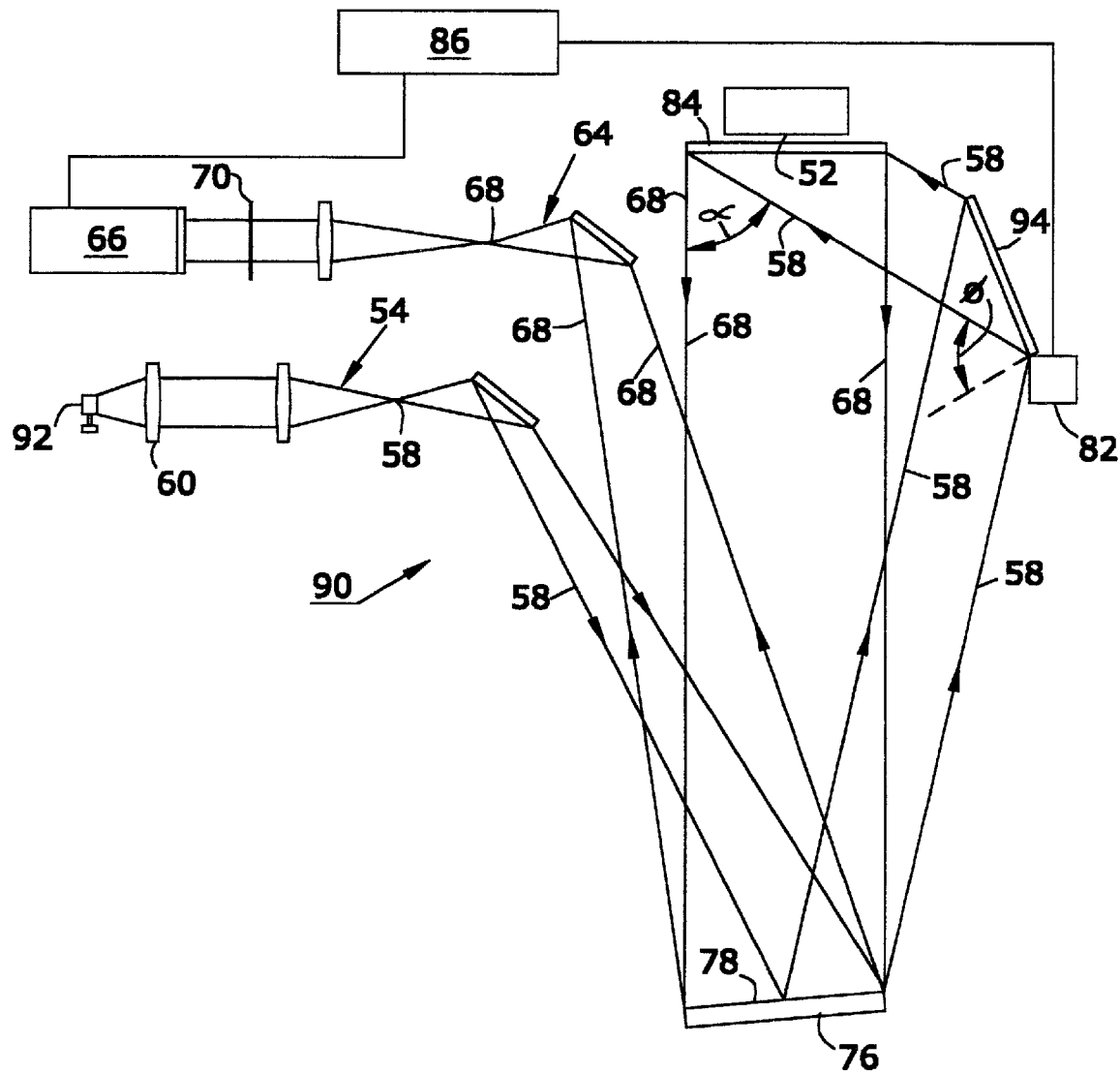
FIG. 3 is a diagram of a new moiré interferometer for measuring surface flatness by conveying interference fringes to a test surface through a common optic with a viewing system that images the interference pattern on the test surface.

Another projection moiré interferometer 90 is shown in FIG. 3 with like reference numerals for elements in common with the projection moiré interferometer 50. The main differences are found in the illuminating system 54, where an alternative grating pattern forming structure utilizes the mechanism of interference to project a virtual grating onto the test surface 52.

Although telecentric projection components including the projection optics 60 and the common focusing optic 36 are retained by the illuminating system 54, the grating 62 has been replaced by changes to a light source 92 and a directional optic 94. The light source 92 is a coherent light source such as a laser for producing a beam of coherent light, and the directional optic 94 is a two-surface reflecting element for laterally shearing the beam of coherent light into two overlapping interfering beams.

An interference pattern produced by the laterally sheared interfering beams is the equivalent of a linear grating pattern when projected onto the test surface 52. Fringe spacing of the interference pattern appearing on the test surface 52 is matched to the desired period by adjusting angularity between the overlapping interfering beams.

Figure 4:
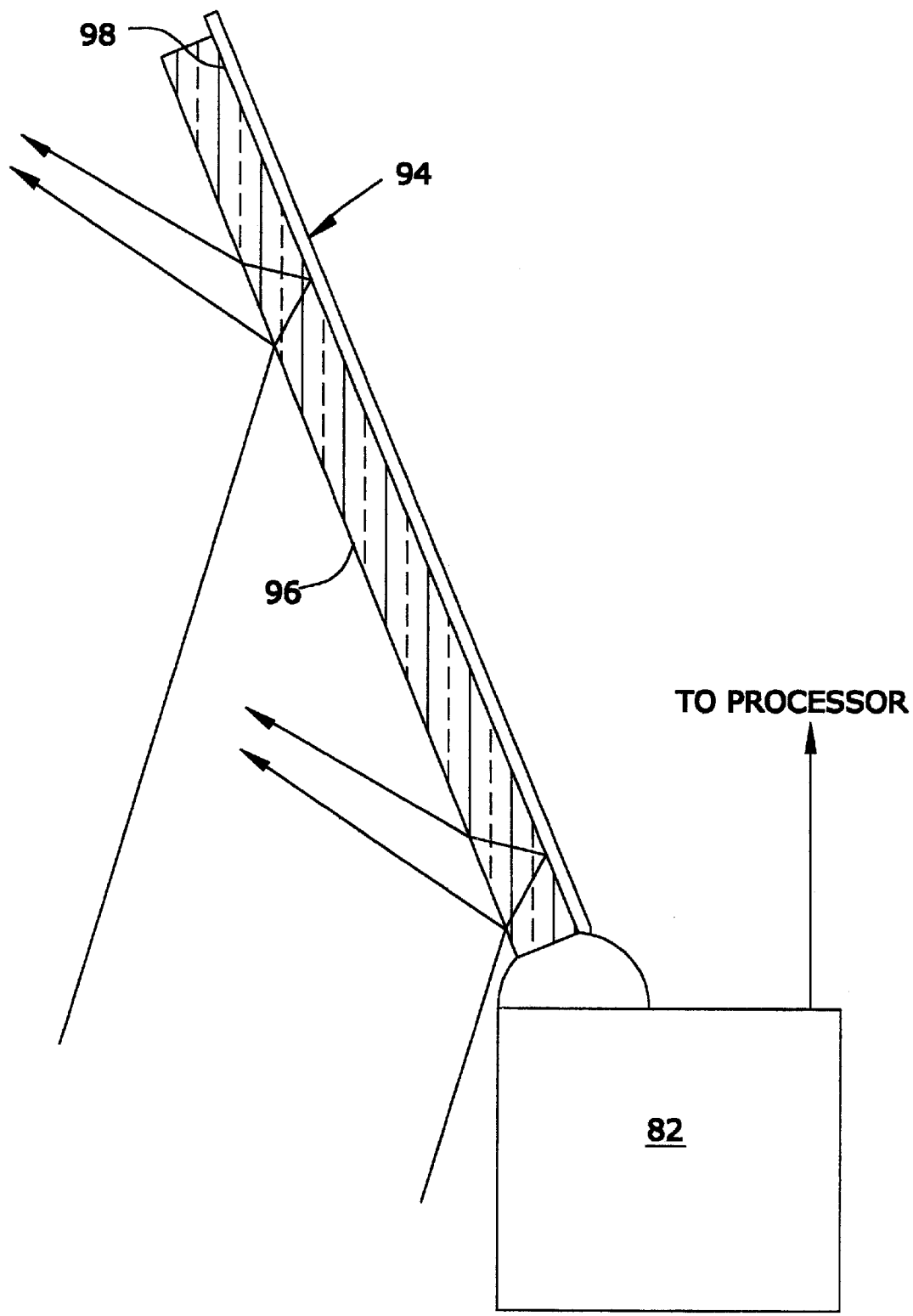
FIG. 4 is a side view of a directional optic arranged for dividing an incident beam into two interfering beams and for angularly varying the projection of interference fringes onto the test surface for purposes of phase shifting.

Referring to FIG. 4, the directional optic 94, which takes the form of a two-surface reflecting element, has a partially reflective top surface 96 and a partially reflective bottom surface 98 which reflect incident light in two substantially equal proportions. However, the top surface 96 is inclined with respect to the bottom surface 98 to adjust the fringe spacing of the interference pattern to match a desired grating period.

The servo-drive 82 under control of the processor 86 adjusts the directional optic 94 through the increments of angle "$\phi$" to vary an overall angle of incidence "$\alpha$" at which the interference pattern is projected onto the test surface 52. For purposes of phase shifting, the directional optic 94 is pivoted through a range of increments of angle "$\phi$" corresponding to at least one fringe spacing. The processor 86 gathers intensity information from the fringe pattern detector 66 at each of the increments and eventually converts this information into measures of the test surfaces deviation from a reference plane.

Both the beam dividing and the phase shifting functions of the directional optic 94 can take place elsewhere within the illumination system 54. The beams can be divided at any of the existing optical components or by a beamsplitter inserted for this purpose. Phase shifting can also be accomplished in a variety of ways including by moving the light source 92, the test surface 52 or other of the intervening components of this or the other embodiments.

Although the light source 92, like the light sources 16 and 56, preferably produces light beams within the visible portion of the spectrum, light beams in the near infrared or other non-visible portions of the spectrum can also be used. The fringe pattern detectors 26 or 66 are matched to the wavelength range of the light sources 16, 56, and 92.

The focusing optic 36 or 76 is preferably a concave mirror sized in area slightly larger than the largest test surface area intended for evaluation. Normally, a simple spherical shape reflecting surface 38 or 78 provides enough accuracy, particularly for relaying fringes. However, the reflecting surface 38 or 78 can depart from a spherical form to reduce errors, where more accurate imaging is needed (such as the projection of accurate grating images).

The grating pattern appearing on the test surface can be formed in a variety of ways including by shadowing or projecting actual gratings or a combination of gratings or by producing an equivalent pattern by other optical mechanisms including the mechanism of interference. Similarly, the reference grating pattern can be based on an actual grating structure, a combination of actual grating structures, or a virtual grating such as a grating pattern represented in software.

We claim:

1. An apparatus for measuring flatness of a test surface using moiré topography comprising:
   an illuminating system including a light source and an optical pathway for conveying light from the light source to the test surface;
   an imaging system including a fringe pattern detector and an optical pathway for conveying an image of the test surface to the fringe pattern detector;
   a grating pattern that is illuminated on the test surface by the illuminating system and that is imaged onto the detector by the imaging system for producing together with a reference grating pattern a moiré fringe pattern indicate of the flatness of the test surface;
   a focusing optic positioned at an intersection of the optical pathways that convey light both to and from the test surface en route from the light source to the detector;
   the focusing optic being arranged as a part of the illuminating system and as a part of the illuminating system to collimate light en route to the test surface at a first angle thereby contributing to forming on the test surface a telecentric reproduction of the grating pattern; and
   the focusing optic being arranged as a part of the imaging system and as a part of the imaging system to relay collimated light at a different angle from the test surface thereby contributing to forming on the detector a telecentric image of the grating pattern reproduction appearing on the test surface.

2. The apparatus of claim 1 in which the focusing optic is a reflective focusing optic.

3. The apparatus of claim 2 in which the focusing optic is a concave mirror.

4. The apparatus of claim 1 in which the grating pattern is formed by casting a shadow pattern of an actual grating onto the test surface.

5. The apparatus of claim 4 in which the focusing optic collimates light en route to the actual grating for casting a high contrast shadow pattern onto the test surface.

6. The apparatus of claim 5 in which the focusing optic gathers light from both the actual grating and the grating's shadow pattern on the test surface for forming the moiré fringe pattern at the detector.

7. The apparatus of claim 1 in which the grating pattern is formed by a projection of an actual grating onto the test surface.

8. The apparatus of claim 7 in which the focusing optic contributes to forming a telecentric image of the actual grating on the test surface.

9. The apparatus of claim 8 in which the focusing optic gathers light from the telecentric image of the grating pattern on the test surface and produces another telecentric image of the grating pattern on the detector.

10. The apparatus of claim 1 in which the light source is a coherent light source and the grating pattern is formed by the mechanism of interference.

11. The apparatus of claim 10 in which the focusing optic coveys coherent light to the test surface and relays an image of the grating pattern on the test surface to the detector.

12. The apparatus of claim 11 in which the coherent light is divided into two angularly related portions for producing a fringe pattern having a predetermined frequency on the test surface.

13. The apparatus of claim 1 further comprising a directional optic located along the optical pathway of the illuminating system between the focusing optic and the test surface for controlling an angle of incidence at which the grating pattern is illuminated on the test surface.

14. The apparatus of claim 13 in which the focusing optic collects light directly from the test surface and conveys light indirectly to the test surface through the directional optic.

15. The apparatus of claim 13 in which the directional optic is pivotable for adjusting the angle of incidence at which the grating pattern is illuminated on the test surface.

16. A moiré interferometer for detecting variations in a test surface comprising:
    a light source that produces a beam of light for illuminating a grating pattern on the test surface;
    a focusing optic positioned to convey the beam of light oblique to the test surface;
    a directional optic that redirects the oblique beam of light towards the test surface;
    a fringe pattern detector that receives an image of the grating pattern appearing on the test surface;
    processor that evaluates a combination of a reference grating pattern and the image of the grating pattern appearing on the test surface to detect variations in the test surface;
    said focusing optic also being positioned to collect light from the test surface independent of the directional optic for relaying the image of the grating pattern appearing on the test surface to the fringe pattern detector;
    a grating located between the directional optic and the test surface for casting a shadow in the form of the grating pattern on the test surface; and
    the focusing optic being arranged to collect light from both the grating and its shadow on the test surface for combining the reference grating pattern with the grating pattern appearing on the test surface.

17. The interferometer of claim 16 in which the grating has a planar substrate that supports the test surface.

18. The interferometer of claim 16 in which the focusing optic is a collimating mirror.

19. A moiré interferometer for detecting variations in a test surface comprising:
    a light source that produces a beam of light for illuminating a grating pattern-on the test surface;
    a focusing optic positioned to convey the beam of light oblique to the test surface;
    a directional optic that redirects the oblique beam of light towards the test surface;
    a fringe pattern detector that receives an image of the grating pattern appearing on the test surface;
    a processor that evaluates a combination of a reference grating pattern and the image of the grating pattern appearing on the test surface to detect variations in the test surface;
    said focusing optic also being positioned to collect light from the test surface independent of the directional optic for relaying the image of the grating pattern appearing on the test surface to the fringe pattern detector;
    a first grating located between the light source and the focusing optic;
    a projection optic for projecting an image of the first grating onto the test surface to form the grating pattern on the test surface; and
    a second grating located between the focusing optic and the detector to combine the reference grating pattern with the image of the grating pattern on the test surface.

20. A moiré interferometer for detecting variations in a test surface comprising:
    a light source that produces a beam of light for illuminating a grating pattern on the test surface;
    a focusing optic positioned to convey the beam of light oblique to the test surface;
    a directional optic that redirects the oblique beam of light towards the test surface;
    a fringe pattern detector that receives an image of the grating pattern appearing on the test surface;
    a processor that evaluates a combination of a reference grating pattern and the image of the grating pattern appearing on the test surface to detect variations in the test surface;
    said focusing optic also being positioned to collect light from the test surface independent of the directional optic for relaying the image of the grating pattern appearing on the test surface to the fringe pattern detector; and
    the light source being arranged to produce a coherent light beam, and the grating pattern on the test surface being formed by two interfering portions of the coherent light beam.

21. The interferometer of claim 20 in which the directional optic divides the coherent light beam into the two interfering portions.

22. Apparatus for discerning surface topography with moiré fringes comprising:
    a light source that produces a light beam;
    an illumination pathway that conveys the light beam to a test surface;
    a grating pattern forming structure located along the illumination pathway for illuminating a grating pattern on the test surface from a first angular perspective;
    an imaging pathway that relays an image of the grating pattern appearing on the test surface from a second angular perspective;
    said grating pattern on the test surface being combinable with a reference grating pattern for producing the moiré fringes;
    a focusing optic located along both the illumination pathway and the imaging pathway for conveying the light beam to the test surface and for relaying the image of the grating pattern on the test surface; and
    the focusing optic-being a reflective optic that reflects the light beam traveling along the illumination pathway and the image relayed along the imaging pathway at a different angle.

23. The apparatus of claim 22 in which the focusing optic is a collimator that collimates the light beam en route to the test surface.

24. The apparatus of claim 23 in which the focusing optic is a concave mirror.

25. The apparatus of claim 22 in which the grating pattern forming structure is an actual grating located along the illumination pathway between the light source and the test surface.

26. The apparatus of claim 25 in which the reference grating pattern is formed on the actual grating and the grating pattern appearing on the test surface is formed as a shadow of the actual grating.

27. The apparatus of claim 26 in which the actual grating has a planar substrate that supports the test surface.

28. The apparatus of claim 25 further comprising projection optics that cooperate with the focusing optic for projecting a telecentric image of the actual grating onto the test surface.

29. The apparatus of claim 28 in which the reference grating pattern is formed by a reference grating located along the imaging pathway.

30. The apparatus of claim 22 in which the grating pattern forming structure utilizes a mechanism of interference for forming the grating pattern on the test surface.

31. The apparatus of claim 30 further comprising a directional optic located along the illumination pathway for dividing the light beam into two interfering beams.

32. The apparatus of claim 31 in which the directional optic is located between the focusing optic and the test surface and is angularly adjustable for controlling the first angular perspective at which the grating pattern is illuminated on the test surface.

33. A method of determining the flatness of a test surface by moiré topography comprising the steps of:

directing a light beam along an illumination pathway to the test surface;

forming a grating pattern on the test surface from a first angular perspective;

relaying an image of the grating pattern from a second angular perspective along an imaging pathway to a fringe pattern detector;

combining the grating pattern on the test surface with a reference grating pattern for producing moiré fringes;

intersecting both the illumination pathway and the imaging pathway with a common focusing optic that conveys the light beam to the test surface and relays the image of the grating pattern to the fringe pattern detector;

using the common focusing optic to collimate the light beam en route to the test surface forming the grating pattern on the test surface from the first angular perspective as a telecentric reproduction of the grating pattern; and using the common focusing optic to relay a telecentric image of the grating pattern appearing on the test surface from the second angular perspective to the fringe pattern detector.

34. The method a claim 33 in which the step of intersecting includes both reflecting the light beam en route to the test surface and reflecting the image of the grating pattern en route to the fringe pattern detector.

35. The method of claim 34 in which the step of intersecting includes reflecting the light beam and the image of the grating pattern at different angles.

36. The method of claim 35 including a further step of directing the reflected light beam at a predetermined angle of incidence to the test surface.

37. The method of claim 36 in which the step of directing includes reflecting the light beam from a reflective optic that is angularly adjustable for varying the angle of incidence at which the light beam illuminates the test surface.

38. The method of claim 33 in which the-step of forming the grating pattern includes positioning a grating along the illumination pathway for casting a shadow of the grating onto the test surface.

39. The method of claim 38 including the step of supporting the test surface with the grating.

40. The method of claim 33, in which the step of forming the grating pattern includes dividing the light beam into two interfering beams for producing an interference pattern on the test surface.

41. The method of claim 33 in which the step of forming includes utilizing the common focusing optic to telecentrically project the grating pattern onto the test surface.

42. The method of claim 33 in which the test surface has a defined area for evaluating fitness and including a further step of sizing a reflective area of the common focusing optic larger than the defined area of the test surface.

* * * * *